Sept. 3, 1968   G. KAZLAUSKAS   3,400,237
WELDING HEAD
Filed Dec. 1, 1964   3 Sheets-Sheet 1
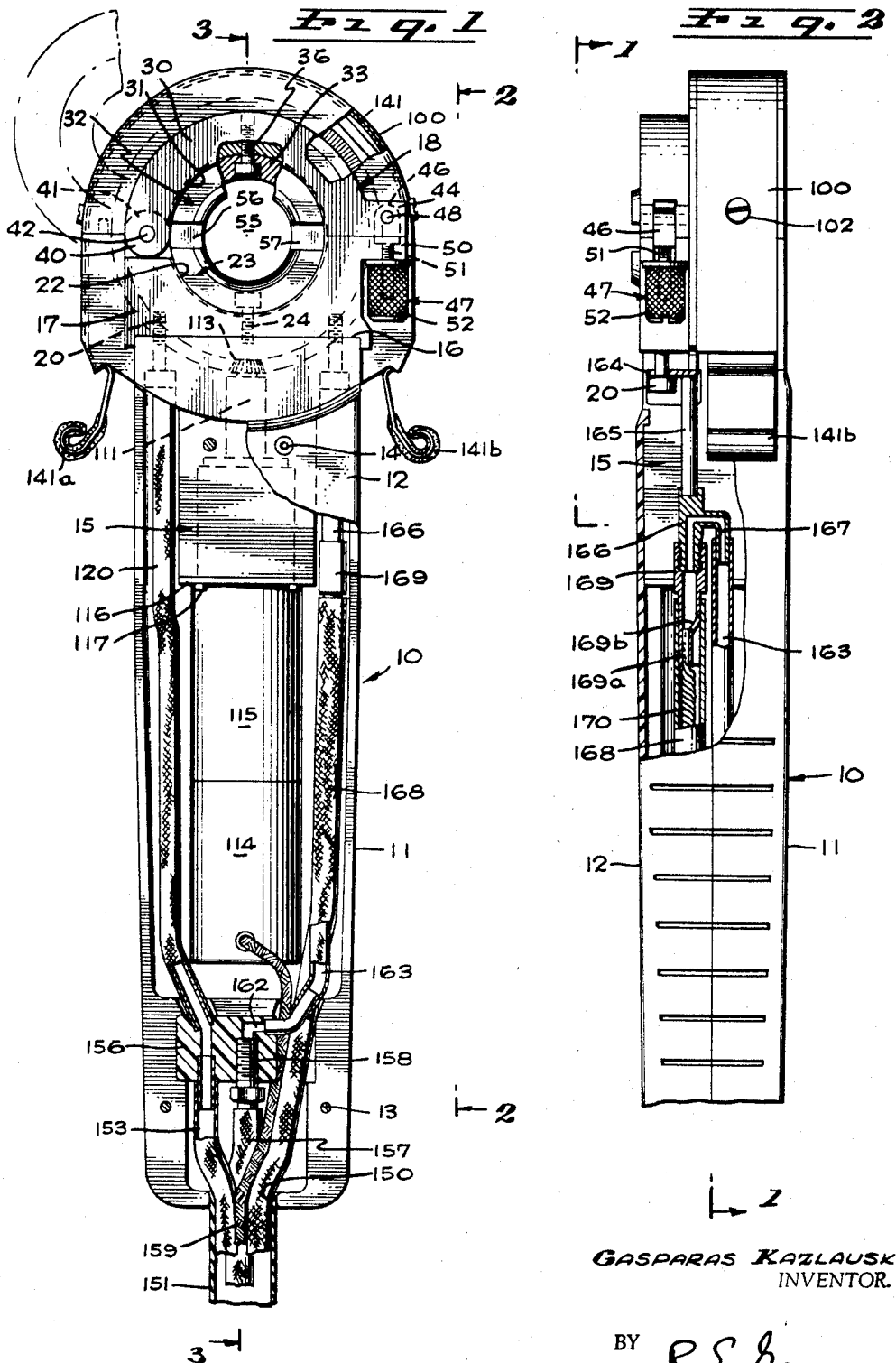
GASPARAS KAZLAUSKAS
INVENTOR.
BY R. E. Geangue
ATTORNEY

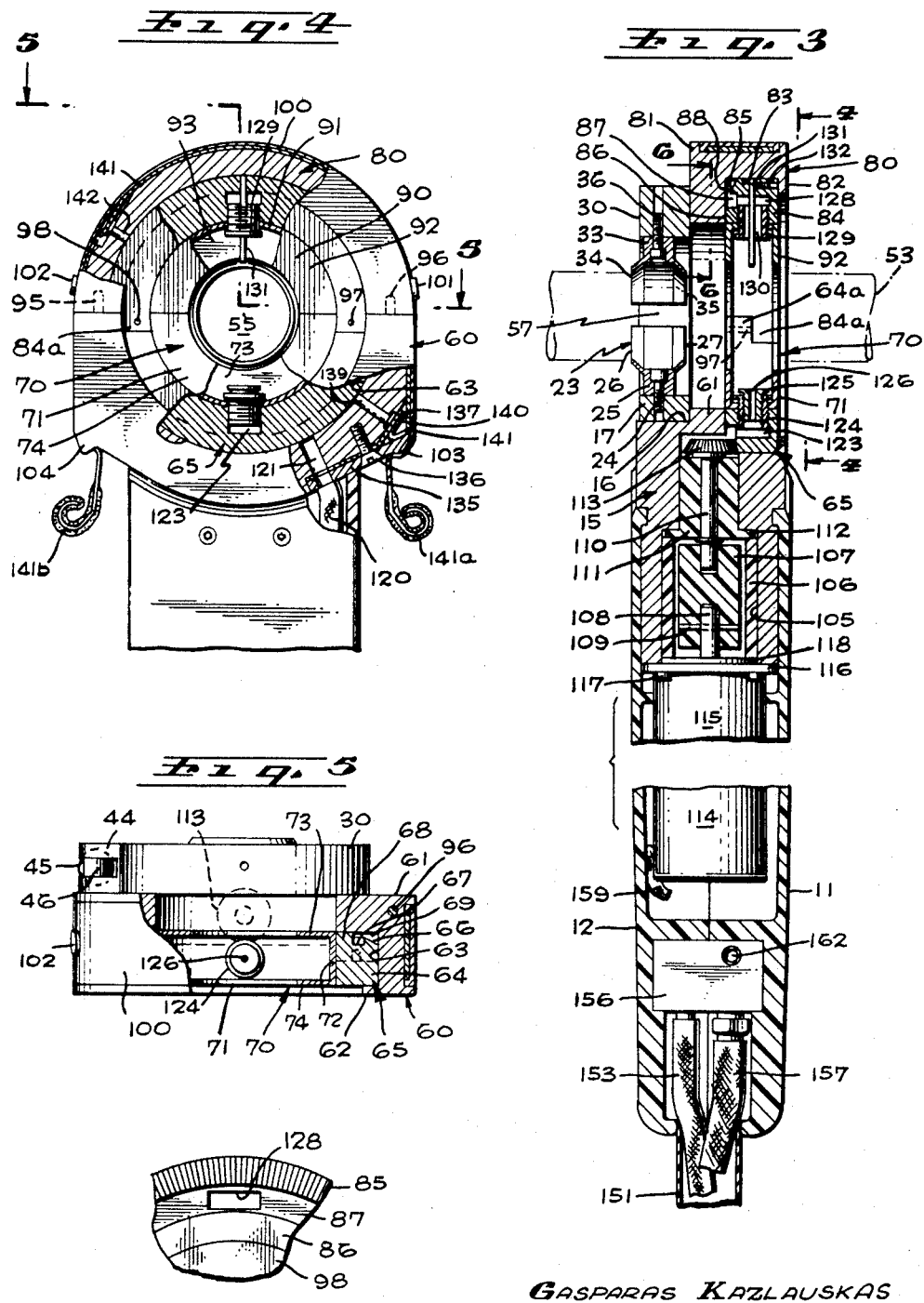

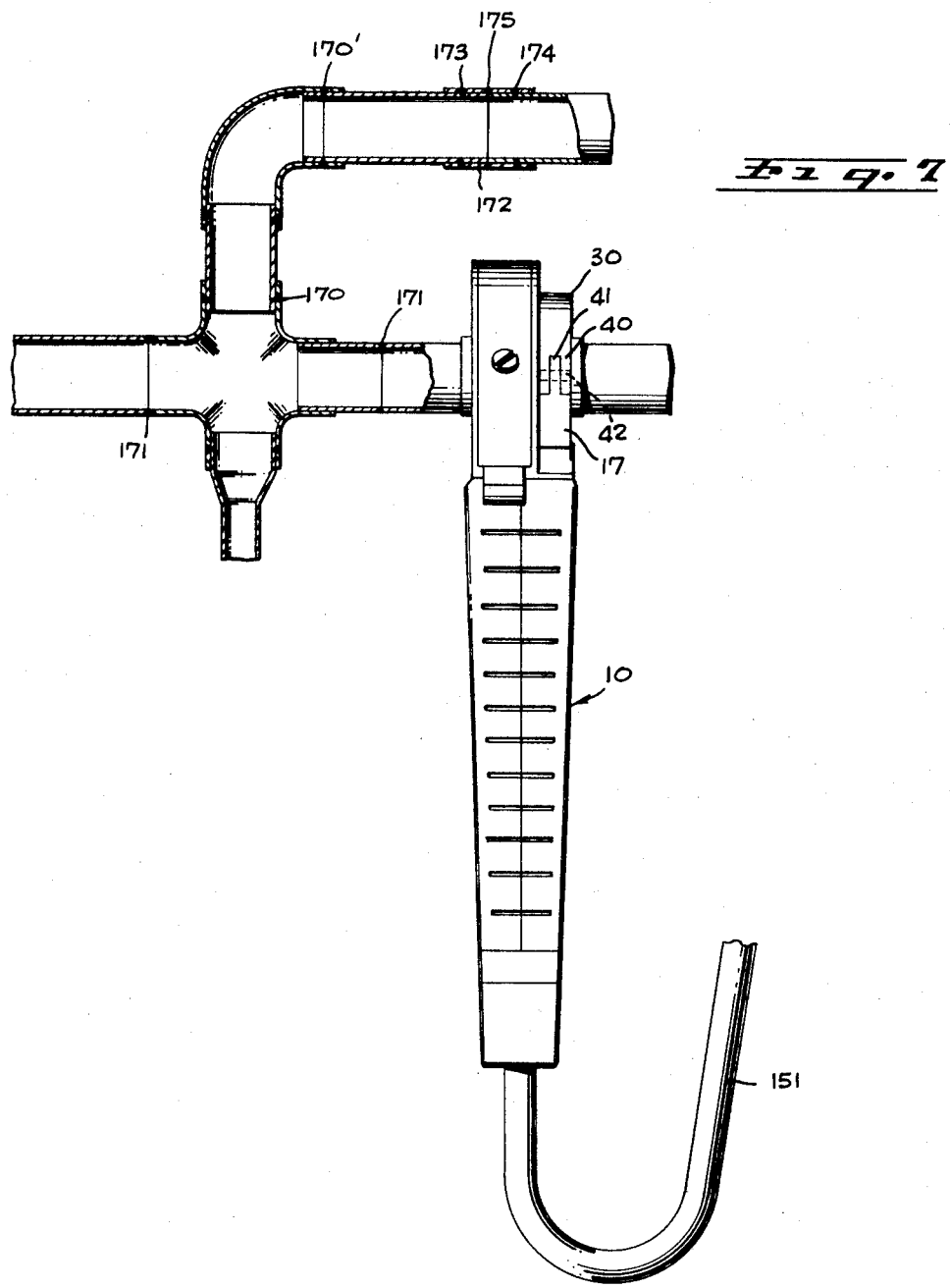

United States Patent Office 3,400,237
Patented Sept. 3, 1968

3,400,237
WELDING HEAD
Gasparas Kazlauskas, 4804 Gaviota Ave.,
Encino, Calif. 91316
Filed Dec. 1, 1964, Ser. No. 415,058
13 Claims. (Cl. 219—60)

ABSTRACT OF THE DISCLOSURE

A welding head for tubes and the like having a handle rotatably mounting a driven external ring gear containing an annular gas cup through which a tube to be welded is axially inserted and held in centered position by a combined tube gripping and grounding clamp on the handle. The ring gear carries an electrode which extends radially through the cup and rotates about the tube to produce a weld when the gear is driven in rotation with a welding voltage impressed across the tube clamp and electrode. An inert gas flows through the cup directly to the exterior of the handle through a flow space defined between the cup and tube to prevent oxidation and cool the gear.

---

This invention relates to a weld head and more particularly to a weld head for the place tube welding which controls the factors affecting the thermal conditions of the weld.

Prior welding heads have utilized a split gear carrying an electrode and located in a casing containing an inert gas. However, such devices did not insure a constant arc length at the welding electrode and arcing across the gear segments took place thereby affecting the electrode voltage. Also, the gear segments were subjected directly to the welding heat of the arc since there was no insulation between the arc and the electrode holder. Further, there was no grounding of the tubing through the welding head so that a separate ground cable had to be attached to the tubing at a location displaced from the weld.

The present invention provides a gap cup between the gear segments and the tube weld which serves to limit the heating of the gear segments. The tungsten electrode projects from the gear through an enlarged opening in the bottom of the gas cup and the inert gas is fed through this opening into the gas cup. The gas leaks solely through a clearance between the gas cup and the outside of the tube to atmosphere so as not to build up a pressure around the molten weld. However, gas is always confined between the gear segments and the welding location to provide an inert atmosphere at the weld area. A constant welding potential is provided at the electrode by applying the welding current continuously to both gear segments. Since the potential on each segment is always the same, arcing across the air gap between gear segments is eliminated and a uniform welding current is available at the electrode. In other words, regardless of the position of the segment carrying the electrode, each segment has a direct contact with the welding current source. A spring type clamp is also provided which accurately positions the weld head in relationship to the center line of the tube to be welded while firmly gripping the tube regardless of small differences in size allowed by tube manufacturers' diameter tolerances. By utilizing an insulated handle, the inert gas and welding current can be carried by the same line after entering the handle to greatly simplify the handling of these components. Also, the insulated handle permits the tube to be grounded by a line through the handle rather than by a separate line connected with the tube. Because of the compact design of the weld head, it has a small envelope which enables welding in restricted areas.

It is therefore an object of the present invention to provide a weld head for in place tube welding in which the various factors affecting the thermal condition of the weld are controlled.

Another object of the invention is to provide a weld head for in place tube welding in which the electrode is driven around the tubing by a gear divided into segments; the same welding potential being continually applied to both segments to prevent arcing between the gear segments.

Another object of the invention is to provide a weld head for tube welding in which the electrode is driven by a gear having a gas cup formed at the inner side thereof to confine inert gas around the electrode and protect the gear from the heat of the arc.

A further object of the invention is to provide a weld head for tube welding having a handle for supporting a rotating gear about the tube, said tube being grounded by a conductor passing through the handle.

Another object of the invention is to provide a weld head for tube welding having a clamp for holding the tubing concentrically with the circular path of a rotating electrode.

Another object of the invention is to provide a weld head for in place tube welding which is compact in structure in order to enable the performance of welding in restricted areas that are normally inaccessible.

These and other objects of the invention not specifically set forth above will become readily apparent from the accompanying description and drawings in which:

FIGURE 1 is a section along line 1—1 of FIGURE 2 showing the tube clamp on the end of the handle and the motor for driving the gear segments;

FIGURE 2 is a side elevational view along line 2—2 of FIGURE 1;

FIGURE 3 is a transverse vertical section along line 3—3 of FIGURE 1 showing the gear segments and the tube clamp;

FIGURE 4 is a side elevational view, partly in section, along line 4—4 of FIGURE 3 showing the strap for holding the gear segments together during the welding operation;

FIGURE 5 is a section along line 5—5 of FIGURE 4 showing the construction of the gear segments and of the gas cup;

FIGURE 6 is a section along line 6—6 of FIGURE 3 showing one of the entrances for the inert gas into the gas cup; and FIGURE 7 is a sectional view of various types of welds which can be made with the weld head.

Referring to the embodiment of the invention chosen for purposes of illustration, the weld head comprises a non-conductive handle 10 which is split into halves 11 and 12 and the halves are secured together by means of screws 13 and 14. The screws 14 pass through a block 15 curved in the open end of handle 10 and the block 15 has an upper edge 16 which supports a lower clamp section 17 of tube clamp 18. The lower section 17 is secured to the edge 16 by means of screws 20 (see FIGURE 1). The lower section 17 has a semicircular cutout 22 in which is inserted a lower portion 23 of the clamp and this lower portion is held in the lower section 17 by means of the screw 24. The clamp portion 23 consists of a curved base 25 and two outwardly extending flexible lips 26 and 27 (see FIGURE 3). The upper section 30 of the clamp 18 has a semicircular cutout 31 similar to cutout 22 which receives the upper portion 32 of the tube clamp. The upper portion 32 of the clamp has a curved base 33 which supports lips 34 and 35 and a bolt 36 holds the upper clamp portion 32 to the upper section 30 of the clamp. The upper section 30 is split at end 40 to receive a projection 41 on the lower section 17 and a pin 42 passes through the split end and the projection 41 in order to pivotally connect the upper section 30 with the lower section 17 (see FIGURE 7). The other end 44 of the section 30 has a slot 45 which receives end 46 of a lock 47 and pivotally mounts same by means of pin 48. The lower clamp section 17 has an end projection 50 opposite the end 44 and end 50 also has slot for receiving shaft 51 of the lock 47. A lock head 52 is threaded to the end of the shaft 51 and after the shaft is received in end 50, the head 52 is tightened up in order to lock the two sections 30 and 17 together.

In operation of the welding head, a tube is inserted within the circular opening 55 defined between the tube clamp portions 23 and 32, the tube being designated by phantom line 53 in FIGURE 3. During insertion of the tube, the section 30 can be swung into the phantom line position of FIGURE 1 and can then be pivoted over the tube so that the end projections 44 and 50 can be clamped tightly together by the head 52. Since there are spaces 56 and 57 left between the ends of the clamp portions 23 and 32 and since the lips 26, 27, and 34, 35 are somewhat flexible, the clamp 18 can tightly clamp tubes of diameters which vary within the manuafcturing tolerance of the tubes. In other words, a tube which is oversized will somewhat flex the lips but the lips will still tightly clamp the tube in concentric position within the welding head.

The handle 10 also supports a welding head structure by means of a semicircular projection 60 on block 15. The projection 60 has an inner section 61 and a lip 62 which define a semicircular cutout 63 for a first semicircular gear segment 64 of gear 65. A beveled gear face 66 is located on gear segment 64 opposite section 61 and a groove 67 separates the gear face from a gear portion 68 which bears against section 61 during rotation of gear 65 and forms a manifold space 69. A circular gas cup 70 has a first semicircular section 71 secured to gear segment 64 at portion 72 and has sides 73 and 74 extending inwardly from the gear segment. A semicircular cover 80 has a body portion 81 and a lip 82 between which is a semicircular cutout 83. A second semicircular gear segment 84 is located within the cutout 83 and has a beveled face 85, a groove 87, and a portion 86 bearing against body portion 81 to form a second semicircular manifold 88 which is co-extensive with the manifold space 69 for the first gear segment 64. A second gear cup section 90 has a bottom 91 connected with gear segment 84 and sides 92 and 93 are shaped the same as sides 73 and 74 on the first gear segment 64 so that the two cup sections define the complete circular gas cup 70.

As illustrated in FIGURE 4, the projection 60 carries a pair of pins 95, 96 (see FIGURE 4) which project into openings in the ends of cover 80 in order to form a circular opening. In assemblying the gear segments on the welding head, the lower gear segment 64 is first inserted into the cutout 63 in the projection 60. The ends 84a of the second gear segment 84 overlap cutaway ends 64a of the first gear segment 64 and are locked together by pins 97 and 98 carried by ends 84a and insertable into openings in ends 64a to form a circular opening through the gas cup 70. After the gear segments are attached together, the cover 80 is placed over the second gear segment 84 which is received in the circular cutout 83. The outer surface of the cover 80 has a groove containing a conducting band 141 and an insulating band 100 which is secured to the cover by means of screws 101 and 102 on opposite sides of the cover member. The ends of the conductive band 141 project downwardly over the projection 60 and have locking ends 141a and 141b which snap over portions 103 and 104 on opposite sides of the extension 60 to thereby tightly secure the cover 80 to the projection 60. After assembly, the projection 60 and the cover 80 contain a circular gear 65 composed of first and second segments 64 and 84 which are locked together and support a circular gas cup 70 comprised of cup portions 71 and 90.

The block 15 has an opening 105 which contains a sleeve 106 surrounding a coupling block 107. The coupling block is attached to one end of shaft 108 by means of the pin 109 and rotation of the block by the shaft 108 causes rotation of shaft 110 inserted into the block. The shaft 110 is supported by a bearing member 111 held within a circular opening in block 15 by the sleeve 106 abutting against the flange 112 on the member 111. Shaft 110 terminates in a bevel gear pinion 113 which is positioned to mesh with the bevel gear face 66 of gear segment 64 and the bevel gear face 85 of gear segment 84. The shaft 108 is driven by the D.C. variable speed motor 114 through a gear reduction device 115 and the motor is supported by a flange 116 attached to the block 15 by means of screws 117 and is centered by a projection 118. Thus, when the motor 114 is energized, it rotates the first and second gear segments and the associated gas cup portion.

A conducting externally insulated tube 120 extends through the handle 10 and terminates at an opening 121 in the projection 60 on block 15. The opening 121 connects with the circular gas manifold comprised of the manifold spaces 69 and 88 located opposite the first and second gear segments, respectively. A slot 123 in the first gear segment 64 connects the manifold with a hollow sleeve 124 threaded into an opening through the gas cup and gear segment 64. A plug 125 having a metering opening 126 so that inert gas can be introduced at a metering rate into the gas cup 70. Also, the second gear segment contains a slot 128 which connects the gas manifold with a hollow sleeve 129 extending through the gas cup 70 and the second gear segment 84. The sleeve 129 contains an opening 130 which connects the manifold passage 88 with the gas cup 70 in order to continually supply inert gas to the gas cup. An electrode 131 extends centrally through the opening 130 and is secured at one end in an opening in the second gear segment 84 by means of a set screw 132. It is therefore apparent that as the gear segments are driven by rotation of the gear 113, the segments one after another will come into contact with the gear 113 and the complete gear will rotate around the tube 53. At the same time, inert gas will be flowing into the continuous gas cup around the gear to cover the weld area between the end of the electrode and the tube. Thus, oxidation of the metal is prevented and the gear is protected against the high temperatures at the weld. The major portion of the inert gas will be introduced to the opening 130 around the electrode to insure an inert atmosphere surrounding the weld location while the size of the opening 126 can be varied to assure complete filling of the gas cup at all times. Since some clearance exists between the tube 53 and the sides of the gas cup, slow leakage of the inert gas is permitted to atmosphere so that pressure will not build up in the gas cup which would tend to deform the soft weld as it is being produced. Thus, the leakage of the inert gas provides a low pressure within the gas cup.

The conducting passage 120 also supplies electrical current to a conducting plate 135 which is attached to projection 60 by screw 136. A terminal 137 is located between plate 135 and projection 60 and is forced against the end of a brush 139 by spring 140. The brush 139 extends through an opening in projection 60 and continually bears against the outer surface of the gear segment which is in the lower cutout 63 in order to supply current to the electrode through the gear. The end 103 of plate 135 is in contact with a conducting band 141 which is underneath the band 100 and locks the cover 80 to the projection 60. When the curved ends 141a and 141b are locked, current is directed from plate 135 through band 141 to a second brush 142 located in an opening in the cover member 80. The band 141 is bent inwardly to provide a spring force against the end of the brush 142 and the brush 142 is continually forced against the outer surface of the gear segment which is in the cover 80. Since current is continually present at the brushes 139 and 142 at the potential, there is no tendency for arcing to take place at the connection between the first and second gear segments and uniform electrical potential is present at the electrode regardless of the location of the electrode around the circumference of the tube. Also, the screws 101 and 102 are made of nylon so as to be non-conductive and the band is of insulating material since band 100 covers the conducting band 141.

The end of the handle 10 has a bottom opening 150 for receiving the welding current, the inert gas supply, the ground cable, and the electrical current for the motor 114. The inert gas is supplied through a tube 153 from the general input cable 151 and tube 153 terminates in a conducting block 156. The welding current line 157, capable of supplying 150 amps at 80 volts open circuit, terminates in a plug 158 screwed in the conducting block 156. The tube 120 connects with the inert gas passage in block 156 and since the tube 120 is conducting, it transmits the welding current from line 157 to the brushes and at the same time as it transmits inert gas to the gas cup. The line 159 carries the 27 volt D.C. for the motor 114. The welding current line 157 is hollow for water cooling of the line since a rise in temperature of the line would affect its resistance and thereby affect the voltage at the electrode 131. The water leaves the block 156 through a passage 162 of nonconducting material and enters a passage 163 located in the handle. A ground terminal plate 164 is clamped against the lower clamp section 17 by means of screw 20 and a bar 165 connects plate 164 to ground attachment 166. The water passage 163 connects with passage 167 of attachment 166 which is coupled to water discharge tube 168 by coupling 169. A ground cable 170 extends to main cable 151 through tube 168 which also receives water from the hollow coupling 169, the end 169a of which is plugged into the end of tube 168 and is fixed to cable 170 while having a passage 169b for the water. Thus, the water flows in through current cable 157 and out through passage 168.

As illustrated in FIGURE 7, a number of types of welds can be produced by the device of the present invention. The overlap welds 170 secure overlapping ends of two tubes while weld 171 secures abutting ends of two tubes. Another weld consists of weld lines 173 and 174 through a sleeve 172 which overlaps the abutting end of two tubes. A weld line 175 is also located at the abutment. The welding head of FIGURE 7 is positioned to make the weld 173 in the sleeve 172 but during the welding, the sleeve 172 is firmly gripped by the clamp portions 23 and 32 which are flexible enough for tube diameter tolerance variation up to .010 inch while still firmly holding the tube. The lips of the clamp serve to center the tube within the welding head so that the electrode 131, as it revolves around the weld line, stays a uniform distance from the sleeve. During the operation of the weld head, the inert gas is continually passing through the gear into the gas cup and the inert gas prevents formation of oxides so that exotic materials, such as titanium and zirconium, can be welded. Also, the presence of the gas in the gas cup protects the complete gear against the high temperature of the arc at the weld, thereby preventing overheating of the gear. Further, the gas cup 70 is fabricated of a high heat resisting insulating material and since the gas cup is between the gear and the arc, it also protects the gear from overheating. The rate of flow of the inert gas into the gas cup can be controlled by the size of the orifice opening 126 and by the size of the opening 130 through which the electrode projects. The duplicate brushes continually bear against the opposite gear segments so that constant potential is available at the electrode to provide a uniform weld current for producing a uniform weld around the weld line. Also, there is no tendency for arcing to take place between the gear segments because the two segments are at the same potential.

While the particular weld head structures herein shown and described in detail are fully capable of obtaining the objects and providing the advantages hereinbefore stated, it is to be understood that they are merely illustrative of the present preferred embodiments of the invention and that no limitations are intended to the details of the construction or design herein shown other than as defined in the appended claims.

What is claimed is:

1. A weld head for welding a cylindrical object comprising:
    a handle having an opening therethrough;
    a circuit gear rotatably mounted in said opening, said gear having a central opening through which said object extends and gear teeth about the outer circumference of said gear;
    an electrode carried by said gear and projecting radially toward said object;
    means forming a confined, annular space between said object and said gear, and passage means communicating said annular space directly to the exterior of said handle;
    means for rotating said circular gear;
    means for supplying inert gas to said space whereby said gas flows through said space and then through said passage means directly to the exterior of said handle to prevent oxidation of the material of said object and cool said gear; and
    means for supplying welding energy to said electrode to produce a weld with said electrode during rotation of said gear.

2. A weld head as defined in claim 1 having means for clamping said object in axial alignment with the axis of said circular gear.

3. A weld head as defined in claim 1 wherein said circular gear is in the form of two segments, said supplying means comprising a pair of generally diametrically opposed brushes on said handle brush means for applying the same potential to both segments simultaneously.

4. A weld head for tube welding comprising:
    a handle containing a motor;
    an annular gear rotatably supported in said handle and driven by said motor;
    a tube clamp supported on said handle adjacent said gear for centering a tube within said gear, said clamp having a central tube receiving opening;
    an annular gas cup concentrically positioned within and secured to said gear and comprising annular side walls projecting inwardly from said gear toward and in surrounding relation to said tube and having central tube receiving openings coaxially aligned with said clamp opening;
    an electrode carried by said gear and projecting through the interior of said gas cup to a position adjacent said tube to form a weld as said gear is rotated by said motor;
    means for continually introducing inert gas to said gas cup to prevent oxidation of the tube material; said gas cup being formed of an insulating high temperature resistant material for protecting said gear from overheating;
    at least one of said cup wall openings being slightly larger in diameter than the portion of the tube extending through the latter opening, whereby there is defined between the edge of the latter opening and said tube portion an annular orifice; and
    said orifice opening directly to the exterior of said handle, whereby said gas flows through said cup directly to the exterior of said handle to cool said gear.

5. A weld head as defined in claim 4 wherein said introducing means comprises an annular gas manifold adjacent said gear and passage means in said gear for connecting said manifold with said gas cup.

6. A weld head as defined in claim 4 having a conducting passage in said handle for carrying both the welding current and the inert gas.

7. A weld head as defined in claim 6 having a grounded conductor in said handle connected to said tube clamp for completing the welding circuit from said electrode.

8. A weld head for tube welding comprising:
a handle containing a motor;
an annular gear rotatably supported in said handle and driven by said motor;
a tube clamp supported on said handle adjacent said gear for centering a tube within said gear;
an annular gas cup concentrically positioned within and secured to said gear and comprising side walls projecting inwardly from said gear to a position adjacent said tube, said cup being formed of an insulating high temperature resistant material for protecting said gear from overheating;
an electrode carried by said gear and projecting through said gas cup to a position adjacent said tube to form a weld as said gear is rotated by said motor;
means for continually introducing inert gas to said gas cup to prevent oxidation of said tube material, said introducing means comprising an annular gas manifold adjacent said gear, and two openings in said gear communicating said manifold with the interior of said cup;
said electrode extending through one of said gear openings and said other gear opening comprising a gas metering orifice; and
said cup side walls being radially spaced from said tube to provide a gas discharge path to atmosphere to prevent excessive pressure buildup in said gas cup.

9. A weld head for tube welding comprising:
a handle containing a motor;
an annular gear rotatably supported in said handle and driven by said motor;
a tube clamp supported on said handle adjacent said gear for centering a tube within said gear;
an annular gas cup concentrically positioned within and secured to said gear and comprising said walls projecting inwardly from said gear to a position adjacent said tube, said cup being formed of an insulating high temperature resistant material for protecting said gear from overheating;
an electrode carried by said gear and projecting through said gas cup to a position adjacent said tube to form a weld as said gear is rotated by said motor;
means for continually introducing inert gas to said gas cup to prevent oxidation of said tube material;
said introducing means comprising a manifold space between one side of said gear and a portion of said handle and passage means in said gear communicating said manifold space with the interior of said gas cup; and
said handle containing a gas passage communicating with said manifold space through which said inert gas may be supplied to said manifold space.

10. A weld head for tube welding comprising:
a handle containing a motor;
an annular gear rotatably supported in said handle and driven by said motor;
a tube clamp supported on said handle adjacent said gear for centering a tube within said gear;
an annular gas cup concentrically positioned within and secured to said gear and comprising annular side walls projecting inwardly from said gear to a position adjacent said tube;
an electrode carried by said gear and projecting through said gas cup to a position adjacent said tube to form a weld as said gear is rotated by said motor;
means for continually introducing inert gas to said gas cup to prevent oxidation of the tube material, said gas cup being formed of an insulating high temperature resistant material for protecting said gear from overheating;
said gear and gas cup comprising first and second semicircular segments;
said handle comprising a removable cover for retaining said gear and gas cup in said handle, a circular track within said handle rotatably containing said segments and comprising a semicircular cutout in a portion of said handle and a semicircular cutout in said cover; and
a bevel gear supported by said handle in meshing engagement with said annular gear and driven by said motor to rotate said annular gear.

11. A weld head as defined in claim 10 having:
first brush means carried by said handle and engaging said circular gear;
second brush means carried by said cover and engaging said circular gear;
said brush means being spaced substantially 180 degrees apart so that one brush means engages each gear segment during rotation of said circular gear; and
means for connecting both said brush means to the same source of welding potential so that both brush means are at the same potential to prevent arcing between the gear segments.

12. A weld for tube welding comprising:
a handle containing a motor;
an annular gear rotatably supported in said handle and driven by said motor;
a tube clamp supported on said handle adjacent said gear for centering a tube within said gear including a first fixed section and a second section hinged to said first section for movement relative thereto, a first clamp portion connected to said first section and a second clamp portion connected to said second section opposite said first section to define a circular opening for said tube when said second section is in closed position, and each of said portions having flexible lips on opposite sides thereof and extending inwardly at an angle to the axis of said clamp to engage and clamp said tube regardless of tolerance differences in the tube diameter;
an annular gas cup concentrically positioned within and secured to said gear and comprising an annular side wall projecting inwardly from said gear to a position adjacent said tube;
an electrode carried by said gear and projecting through the interior of said gas cup to a position adjacent said tube to form a weld as said gear is rotated by said motor; and
means for continually introducing inert gas to said cup to prevent oxidation of the tube material, said gas cup being formed of an insulating high temperature resistant material for protecting said gear from overheating.

13. A weld head for tube welding comprising:
a handle containing a motor;
an annular gear rotatably supported within said handle and driven by said motor;
a tube clamp supported on said handle adjacent said gear for centering a tube within said gear;
an annular gas cup concentrically positioned within and secured to said gear and comprising annular sidewalls projecting inwardly from said gear to a position adjacent said tube;
an electrode carried by said gear and projecting through said gas cup to a position adjacent said tube to form a weld as said gear is rotated by said motor;
means for continually introducing inert gas to said cup to prevent oxidation of the tube material, said gas cup being formed of an insulating high temperature resistant material for projecting said gear from overheating;
means in said handle containing an electrical conductor connected to said electrode for conducting welding current to said electrode and a passage communicating to said cup for conveying inert gas to said cup; and a ground conductor connected to said tube clamp for completing the welding circuit for said electrode.

References Cited

UNITED STATES PATENTS

| 3,069,529 | 12/1962 | Gotch | 219—60 |
| 3,042,787 | 7/1962 | Kotecki | 219—60 |
| 3,035,147 | 5/1962 | Latter | 219—60 |
| 3,084,243 | 4/1963 | Gotch | 219—60 |
| 3,194,937 | 7/1965 | Brons et al. | 219—60 |
| 3,194,936 | 7/1965 | Rohrberg et al. | 219—60 |

RICHARD M. WOOD, *Primary Examiner.*

B. A. STEIN, *Assistant Examiner.*